(12) United States Patent
Koren et al.

(10) Patent No.: US 7,971,524 B2
(45) Date of Patent: Jul. 5, 2011

(54) SYSTEM TO FORM REPEATABLE SHAPED SLUGS FROM A PLASTIC BOTTLE

(75) Inventors: Sagi Koren, Herzylia (IL); Motty Chen, Tel Aviv (IL)

(73) Assignee: Recise Ltd, Kfar Yona (IL)

( * ) Notice: Subject to any disclaimer, the term of this patent is extended or adjusted under 35 U.S.C. 154(b) by 48 days.

(21) Appl. No.: 12/085,525

(22) PCT Filed: Aug. 31, 2006

(86) PCT No.: PCT/IL2006/001018
§ 371 (c)(1),
(2), (4) Date: May 27, 2008

(87) PCT Pub. No.: WO2007/060651
PCT Pub. Date: May 31, 2007

(65) Prior Publication Data
US 2009/0255421 A1    Oct. 15, 2009

Related U.S. Application Data

(60) Provisional application No. 60/739,436, filed on Nov. 25, 2005.

(51) Int. Cl.
*B30B 7/04* (2006.01)
*B30B 9/32* (2006.01)
(52) U.S. Cl. .................. 100/232; 100/240; 100/902
(58) Field of Classification Search ................ 100/317, 100/318, 104, 131, 227, 228, 229 A, 229 R, 100/232, 240, 245, 291, 902; 241/99, 100, 241/225, 236, 243
See application file for complete search history.

(56) References Cited

U.S. PATENT DOCUMENTS 4,475,449 A * 10/1984 Gianelo .................. 100/42
4,932,595 A * 6/1990 Cohen et al. ............ 241/99
5,203,261 A    4/1993 Davis
(Continued)

FOREIGN PATENT DOCUMENTS
DE    20316191 U1 * 2/2004
(Continued)

OTHER PUBLICATIONS

International Search Report for PCT/IL06/01018 dated May 29, 2007.
(Continued)

*Primary Examiner* — Jimmy T Nguyen
(74) *Attorney, Agent, or Firm* — Eitan Mehulal Law Group (57) ABSTRACT

An automated system for producing a slug having a repeatable shape from a plastic bottle, the automated system comprising: a housing having an elongated shape, an axis in a direction of elongation, and an opening configured to receive the bottle in a generally coaxially orientation with the housing; a compacting subsystem adapted to compact the bottle substantially in a first direction within the housing; and a slug processing subsystem adapted to form a slug having an essentially predefined form from the compacted bottle, the slug processing subsystem adapted to form the slug by application of force in at least a second direction, substantially normal to the first direction; wherein the slug processing subsystem is adapted to form a slug from a single compacted bottle; wherein the slug processing subsystem is configured to form a slug having a flattened geometric shape; wherein the flattened geometric shape is a polygon having a characteristic dimension less than 90 millimeters.

9 Claims, 6 Drawing Sheets

U.S. PATENT DOCUMENTS 5,233,917 A * 8/1993 Handzlik .................. 100/232
6,598,522 B2 7/2003 Yamaguchi

FOREIGN PATENT DOCUMENTS

| FR | 2712230 | | 11/1993 |
| FR | 2692190 | | 12/1993 |
| FR | 2692190 | A1 * | 12/1993 |
| JP | 11 319761 | | 11/1999 |
| JP | 2002 210594 | | 7/2002 |
| WO | WO 2005/028196 | | 3/2005 |

OTHER PUBLICATIONS

Supplementary Partial European Search Report dated Aug. 11, 2010 for application EP 06 78 0454.

* cited by examiner

SYSTEM TO FORM REPEATABLE SHAPED SLUGS FROM A PLASTIC BOTTLE

CROSS-REFERENCE TO RELATED APPLICATIONS

The present application is a US National Phase of PCT Application No. PCT/IL2006/001018, filed on Aug. 31, 2006, which claims the benefit under 35 U.S.C. 119(e) of US Provisional Application 60/739,436 filed Nov. 25, 2005, the disclosure of which is incorporated herein by reference.

FIELD AND BACKGROUND OF THE INVENTION

The present invention relates to recycling of plastics and, in particular, it concerns formation of compact repeatable shaped slugs, for recycling or for other use, from PET and other plastic bottles. In the description and claims hereinbelow, the terms "PET bottle" and "plastic bottle" refer to any thermo deformable bottle or container generally designed to be discarded after use. The term "slug", as used in the description and the claims which follow, generally refers to a compacted/crushed/squashed/chopped plastic bottle. The term "repeatable", as used in the description and the claims which follow, is intended to mean a result or a product (such as the shape of a slug) that is invariant in its dimensions (for example) within a given tolerance, the tolerance usually equal to a few percentages of the dimensions.

In the "2003 Report on Post Consumer PET Container Recycling Activity", National Association of PET Container Resources, September 2004, whose disclosure is incorporated herein by reference, it is cited that despite the growing annual rate of usage of plastic drinking bottles (from nearly a million tons of bottles consumed in 1995 to approximately 2 million in 2003), the amount of recycled plastic has not significantly changed in past years and has even declined—from 400,000 tons in 1995 to 350,000 tons in 2002. This data infers an unfortunate negative trend in recycling activities, especially with regard to plastic bottles.

In developed countries protecting the environment by recycling has been defined as a national task. Countries have traditionally committed themselves to specific recycling rate objectives, however the data described hereinabove serves to underscore the need for increased recycling. One way to accomplish this is by the wide scale use of low cost recycling equipment to compact bottles, especially equipment directed for widely distributed home or non-industrial use.

There are number of publications related to plastic bottle compaction equipment which may be directed for home use. The following patent publications, whose disclosure is incorporated herein by reference, cite devices, ostensibly for home or non-industrial use, for squashing and/or crushing plastic bottles:

Metayer, French Patent Application no. 2692190;
Ducreuez, French Patent Application no. 2668732;
Vallee, French Patent Application no. 2712230;
Seidel, German Patent publication no. DE10121599A1;
Montipo, European Patent Application no. EP 149675A2;
Miller, U.S. Pat. No. 6,481,346; and
Lajos Simon, US Patent Application no. 2005/0115420

Devices illustrated and otherwise described in the French and German applications listed hereinabove apply mechanical force (which, in some cases, is motorized) and apply heat to compress, squash, and otherwise compact a plastic bottle.

Montipo, in European Patent Application no. EP149675A2, discloses a bottle squashing device apparently for table top or counter top use, which employs a pressurized steam supply source to aid in reducing the volume of small disposable containers generally of between 250 and 2000 ml capacity.

The US publications noted hereinabove, by Miller and by Lajos Simon, respectively, disclose devices for application of manual turning power to crush a plastic bottle.

Some of the prior art listed hereinabove describe or otherwise show slugs formed after squashing/crushing/compacting in a substantially axial direction. Although somewhat flattened to an approximate thickness of 2 cm or more, the resultant slugs maintain approximately the initial bottle diameter dimension, and thus the slugs are still relatively large. In general, all of the prior art noted above suffers from the following disadvantages:

a slug is produced that is relatively large, especially in diameter, and of variable shape, making subsequent handling, storage, and recycling of slugs more difficult;
the slug produced is not readily removed from the system, thereby necessitating a possibly cumbersome manual removal process;
the systems do not generally have any controlled way of storing liquids drained from compacted bottles and/or the compacting process; and
there is no integrated storage capability for produced slugs.

There is therefore a need for a low cost system that can automatically or semi-automatically produce compact and repeatably shaped slugs from compacted plastic bottles, while handling the slugs and liquids from the compacting and slug forming processes in an automated or semi automated fashion.

SUMMARY OF THE INVENTION

The present invention is a system to form repeatable shaped slugs from a plastic bottle.

According to the teachings of the present invention there is provided a system for producing a slug having a repeatable shape from a plastic bottle, including: a housing having an elongated shape, an axis in the direction of elongation, and an opening configured to receive the bottle in a generally coaxially orientation with the housing; a compacting subsystem adapted to compact the bottle substantially in a first direction within the housing; and a slug processing subsystem adapted to form a slug having a predefined form from the compacted bottle, the slug processing subsystem adapted to form the slug by application of force in at least a second direction, substantially normal to the first direction. Most preferably, the slug processing subsystem is configured to form a slug having a flattened geometric shape. Preferably, geometric shape is a polygon, having a characteristic dimension less than 90 mm. Most typically, the geometric shape is a circle having a diameter less than 90 mm. Most, preferably, the slug processing subsystem is further adapted eject the slug following slug formation. Preferably, a flattened dimension of the flattened geometric shapes is less than 25 mm. Typically, the slug processing subsystem further includes a slug magazine adapted to store a plurality of ejected slugs. Typically, the compacting subsystem is further adapted to collect and store drained liquid from the compacted bottle. Most preferably, the first direction is the axial direction. Preferably, the compacting system is further adapted to compact, chop, grind, and heat the bottle.

There is further provided a method of controllably producing a slug having a repeatable shape from a plastic bottle which is compacted, including the steps of: taking a housing having an elongated shape, an axis in the direction of elongation, and an opening configured to receive the bottle in a generally coaxially orientation with the housing; configuring a compacting subsystem to compact the bottle substantially in a first direction within the housing; and utilizing a slug processing subsystem to form a slug having a predefined form from the compacted bottle, the slug processing subsystem forming the slug in a second direction by applying force in at least a second direction, substantially normal to the first direction. Most preferably, forming a slug further includes forming a slug having a flattened geometric shape.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a system to form repeatable shaped slugs from a plastic bottle The principles and operation of the system to form repeatable shaped slugs from a plastic bottle, according to the present invention may be better understood with reference to the drawings and the accompanying description.

Figure 1:
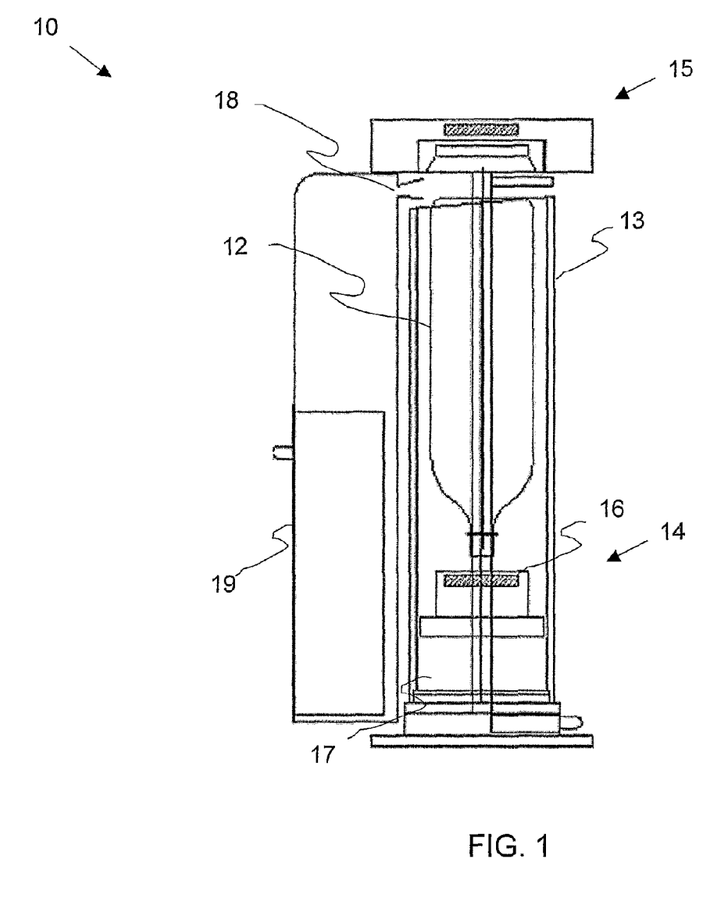
FIG. 1 is a schematic illustration of a system for producing a slug having a repeatable shape from a plastic bottle, in accordance with an embodiment of the current invention.

Referring now to the drawings, FIG. 1 is schematic illustration of a system 10 for producing a slug (not shown in the figure) having a repeatable shape from a plastic bottle 12, in accordance with an embodiment of the current invention. System 10 has an elongated shaped with an axis in the direction of elongation and is shown in the figure with plastic bottle 12 in an inverted position (i.e. with the opening of the bottle facing downward) inside of a housing 13, before the bottle is compacted. System 10 includes a compacting subsystem 14 and a slug processing subsystem 15. Compacting system 14 includes, inter alia, a compaction surface 16 and a liquid drain reservoir 17. Liquid reservoir 17 serves to store any liquid drained from bottle 12 before or during compaction and/or slug processing. Liquid reservoir may be in the form of a reusable container which may be removed, emptied, and replaced in compacting system 15. Alternatively or additionally, liquid reservoir, when filled, may be discarded and replaced by another liquid reservoir.

Compaction of bottle 12 is typically performed by compression or by compression and heating of the bottle, as is know in the art. In the current embodiment of system 10, the bottle is crushed by compaction surface 16, which is driven from the bottom of system 10 upwards so that the slug is then presented to slug processing subsystem 15, with the compaction surface constraining the slug from below.

Slug processing subsystem 15 is then activated to form a repeatable shaped slug (examples of which are shown in subsequent figures). Slug processing subsystem 15 includes, inter alia, a slug ejection opening 18, through which repeatable shaped slugs are ejected following processing, and a magazine 19 where processed and ejected slugs are stored. Magazine 19 typically has a capacity to store 10 or more processed slugs, but variable capacities may be used. The magazine may be removed for emptying and then reattached to slug processing subsystem 15. Additionally or alternatively, magazine 19 may be specially-designed so that when it is filled with slugs, the magazine is removed from the subsystem for further processing, along with the slugs, and a second, replacement empty magazine is attached to the slug processing subsystem. Additionally or alternatively, liquid reservoir 17 may be connected and drain to magazine 19, so that liquids and processed slugs are stored in the magazine until the magazine is emptied. Sensors (not shown in the figures) may be employed to give indications of respective weights and, as a result, respective capacities of the magazine and/or of the liquid reservoir to avoid overfilling. Additional details of slug processing system 15 are discussed hereinbelow in subsequent figures.

The size of bottle 12 processed in system 10 may vary from approximately 300 ml to approximately 3 liters, although larger and smaller bottles may be processed with correspondingly larger and smaller systems, mutatis mutandis.

Figure 2A:
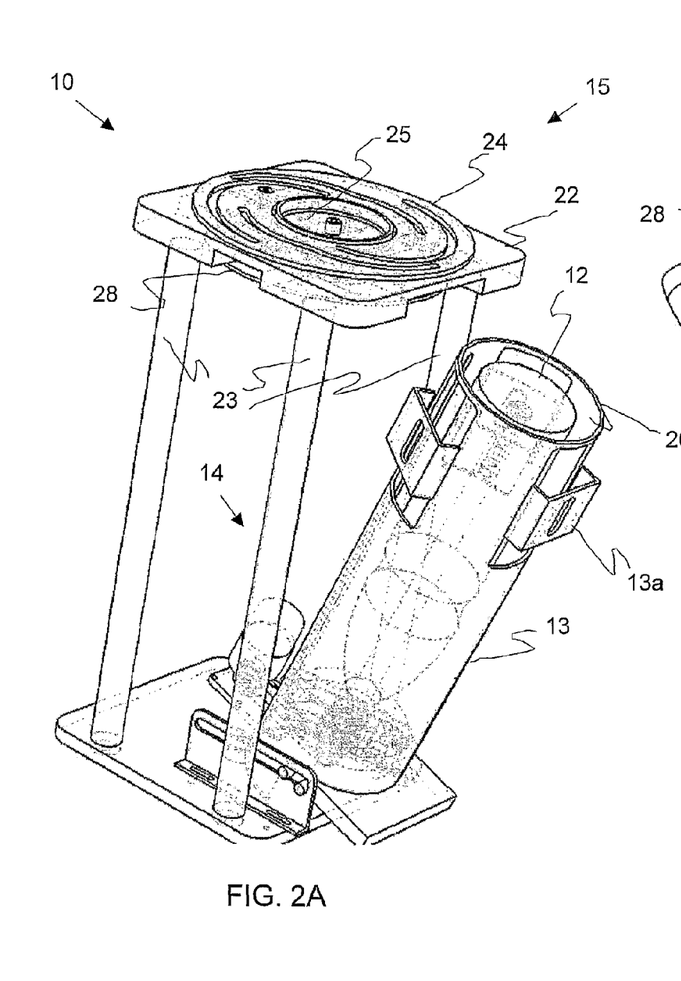
FIGS. 2A and 2B are schematic isometric illustrations of the system of FIG. 1, showing some detail of the slug processing subsystem, in accordance with an embodiment of the current invention.
Figure 2B:
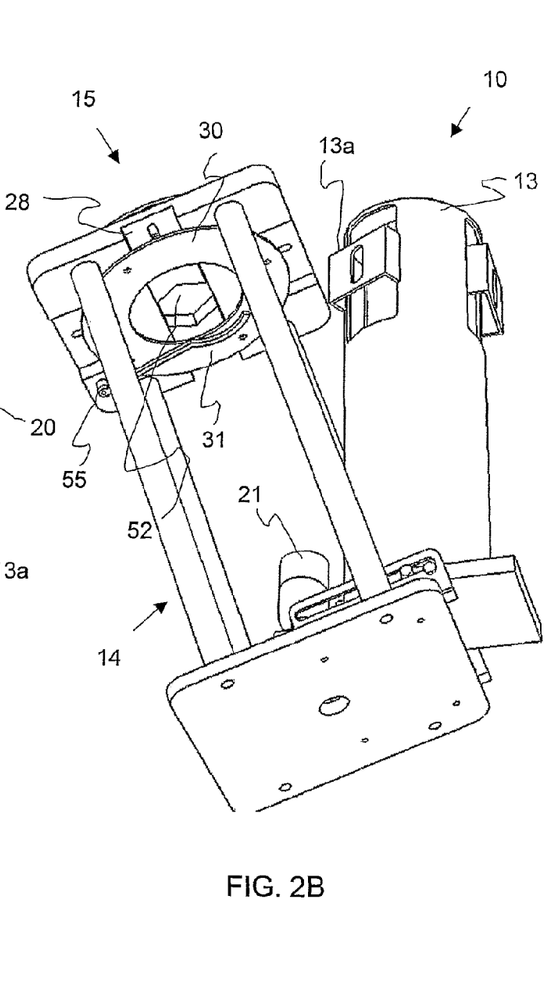
Figure 3A:
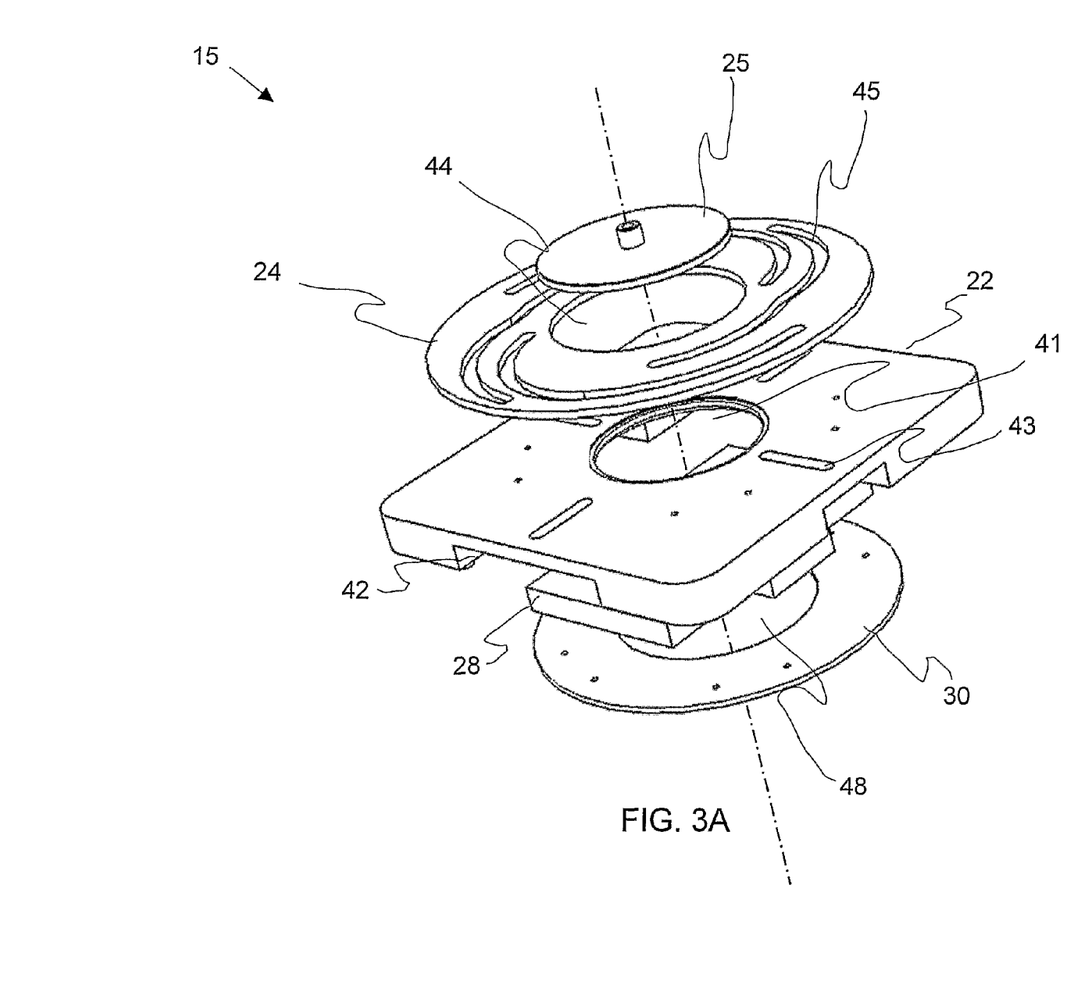
FIGS. 3A-B are schematic isometric illustrations of parts of the slug processing subsystem shown in FIGS. 2A and 2B.
Figure 3B:
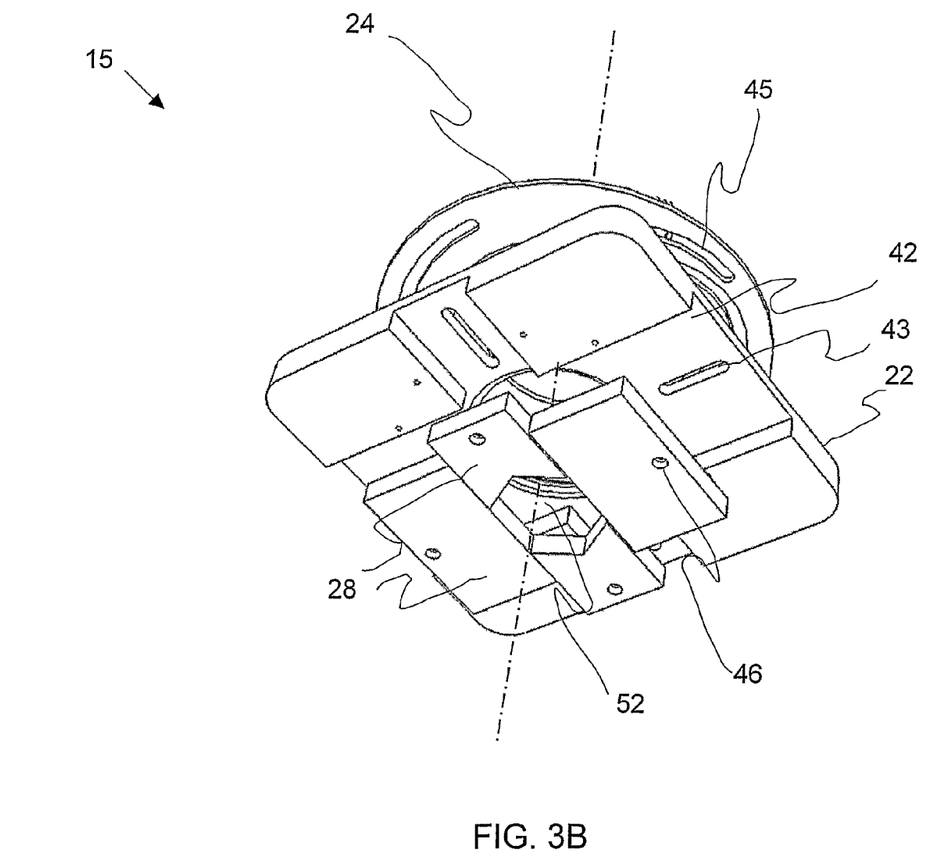

Reference is now made to FIGS. 2A and 2B, which are schematic isometric illustrations of system 10 of FIG. 1, viewed from the side and above and from the side and below, respectively; the figures showing some detail of the slug processing subsystem 15, in accordance with an embodiment of the current invention. Reference is also made to FIGS. 3A and 3B, which are exploded illustrations of some components of slug processing subsystem 15, viewed from above and below, respectively. (Some components of subsystem 15 have been removed in the exploded illustrations of FIGS. 3A and 3B for the purpose of clarity. In addition, central axes indications have been added to FIGS. 3A and 3B to illustrate the relative positioning of component parts. The central axes are substantially collinear with the axis of system 10.) Apart from differences described below, system 10 shown in FIGS. 2A and 2B is generally similar to operation of the system as shown in FIG. 1, and subsystem 15 is generally similar to operation of the subsystem shown in FIGS. 2A and 2B, so that elements indicated by the same reference numerals are generally identical in configuration and operation.

A tilting arrangement of compacting subsystem 14, as shown in FIGS. 2A and 2B, allows loading bottle 12 from an axial opening 20 into housing 13. Following loading of bottle 12, housing 13 is righted to allow bottle compaction to proceed. An alternate configuration (not shown in the figures) of compacting subsystem 14 allows loading the bottle from a lateral opening in housing 13. Another alternate configuration (not shown in the figures) of compacting subsystem 14 and subsystem 15 allows loading the bottle axially from the top end of the housing, by hinging or otherwise displacing and replacing slug processing subsystem 15 to allow the bottle to be loaded. Heaters 13a may be optionally configured on the housing periphery, near the slug processing subsystem 15 to heat the bottle during compaction, as well as to provide heat to the slug as it is presented to subsystem 15. A motor 21, which is part of compacting subsystem 15, serves to provide force and displacement to drive compaction surface 16 (shown in FIG. 1) and thereby crush the bottle.

Slug processing subsystem 15 includes, inter alia: a support plate 22; a slotted drive disc 24, a heater retention disc 25, four formation inserts 28, a slug retention disc 30, and a processed slug ejection arm 31. Support plate 22 has a generally square shape with a circular central opening 41 (refer to FIG. 3A). Four guide fillets 42 are formed in the underside of support plate 22, extending radially from central opening 41 and perpendicularly to each of the four edges of the support plate. Four guide slots 43 are formed in support plate 22, centered on guide fillets 42 and extending radially from central opening 41 and perpendicularly to each of the four edges of the support plate, but terminating before central opening and before the edges of support plate 22. Slotted drive disc 24 has a central opening 44 approximately the same dimension as central opening 41. The slotted drive is positioned concentrically and upon support plate 22. Heater retention disc 25, which may be heated either electrically or by other means, is positioned concentrically within central opening 44, so that the lower face of the heater retention disc is flush with the upper edge of guide slots 43. Heater retention disc 25 is mechanically fixed (such as by brazing or welding, for example) to slotted drive disc 24 and it serves to heat the slug during slug processing.

Formation inserts 28 (viewed in FIG. 3B) are formed to fit within the four guide fillets and flush with the lower surface of support plate 22, with mechanical tolerances allowing a snug fit but allowing relative motion. Each formation insert has a hole 46 formed, as shown in the figure. Hole 46 is formed with tapping, blind tapping (i.e. the hole does not extend to the bottom surface of the formation inserts). The formation inserts are formed so that when they are translated radially inward and join as shown in the figure, they form a closed geometric space 52 (viewed in FIGS. 2B and 3B) which serves as a form for the repeatable shaped slug. Although the current figures show geometric space as a hexagonal shape, other shapes of closed geometric space 52 may be formed by appropriately changing the shape and relative positions of formation inserts 28 to yield various repeatable shaped slugs.

Four bolts (not shown in the figure) are fixedly connected to the formation inserts in the holes. The bolts extend upwards through the respective guide slots, serving to maintain respective formation inserts flush against the upper surface of respective guide fillets 42, but with sufficient mechanical clearance to allow the formation inserts to slide within the guide fillets. The bolts further extend upwards and pass through and terminate above four respective spiral guide slots 45 which are formed in slotted drive disc 22. Spiral guide slots (more easily viewed in FIGS. 3A and 2A) are partially eccentrically formed in the slotted disk drive as shown so that when slotted disc drive 22 is rotated in one direction about the central axis, the bolts are urged radially outwards, and thereby displace the formation inserts radially outwards. When the slotted disk drive is rotated in the opposite direction, the bolts are urged radially inwards, thereby displacing the formation inserts radially inwards. Slug retention disc 30 (viewed in FIGS. 2B and 3A) has a circular form with a retention disc opening 48 formed to be equal to or larger than the diameter of the slug (not shown) presented by the compaction surface described hereinabove. Slug retention disc is attached to the underside of support plate 22 and is maintained flush against the formation inserts, with sufficient clearance to allow formation inserts 28 to move freely. The diameter of disc opening 48 is designed to be slightly smaller than the diameter of the compaction surface, so that when the slug is presented by the compaction surface, the compaction surface abuts slug retention disc 30, thereby constraining the slug within the slug processing subsystem.

Processed slug ejection arm 31 (viewed in FIG. 2B) has an elongated form, terminating in shape approximately matching part of the periphery of slug retention disc 30, as shown. Processed slug ejection arm 31 has a thickness ranging from approximately 15 to 25 mm. The processed slug ejection arm is supported and maintained flush with slug retention disc 30 by drive axis 55 as shown. Drive axis 55 passes through support plate 22 and is rotated either manually or electrically thereby rotating processed slug ejection arm 31, which when rotated, passes beneath retention disc opening 48 and beneath closed geometric space 52.

Overall operation of slug processing subsystem 15 is as described hereinbelow. At the start of slug processing, formation inserts 28 are in their respective furthermost positions from the central axes shown in FIGS. 3A and 3B. As the bottle is compacted by the compaction subsystem, compaction surface 16 drives the slug upward into the slug processing subsystem, namely between the retracted formation inserts and up against heater retention disc 25. Heater retention disc 25 is energized and is thermostatically controlled to maintain an appropriate temperature of the incoming slug during slug processing. Disc 24 is rotated so that formation inserts 28 are driven radially inwards to form closed geometric space 52 and thereby forming the slug into the repeatable slug shape. Disc 24 is then rotated so that formation inserts 28 are translated to their respective furthermost positions from the central axes, thereby releasing the repeatable shape slug, which presently rests on the compaction surface. The compaction surface is then lowered, typically from 30 to 40 mm, and processed slug ejection arm 31 is operated to sweep the repeatable shape slug off of the compaction surface and out through slug ejection opening 18 to the magazine (refer to FIG. 1). Subsystem 15 is then ready to receive the next slug. An additional or alternative configuration of subsystem 15 (not shown in the figures) allows the subsystem, upon completion of slug processing, to be displaced normal to the axis of the compaction subsystem and above the magazine (refer to FIG. 1.), allowing the processed slug to drop into the magazine.

It should be noted that most parts of subsystem 15 are made of materials (such as, but not limited to: aluminum and steel) which must withstand mechanical strain as well as elevated temperatures. In addition, parts which must move with tight tolerances are made of materials and may have coatings which offer low friction, such as but not limited to aluminum with appropriate anodization and metal with Teflon coatings. Although the figures and description hereinabove for subsystem 15 are for support plate 22 having an overall substantially square configuration and four formation inserts, it may be understood that more or less than four formation inserts may be used with subsystem 15 and that support plate may have another configuration, mutatis mutandis, to allow formation of repeatable shape processed slugs.

Figure 4A:
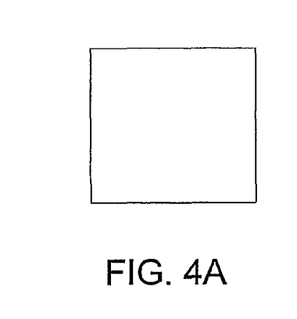
FIGS. 4A-G are illustrations of exemplary repeatable shaped slug geometries formed by the slug processing subsystem in accordance with embodiments of the current invention.
Figure 4B:
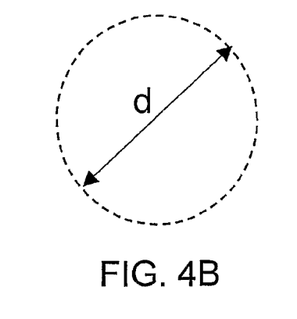
Figure 4C:
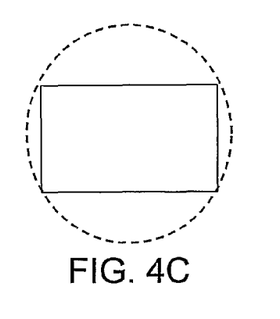
Figure 4D:
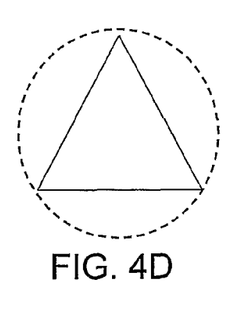
Figure 4E:
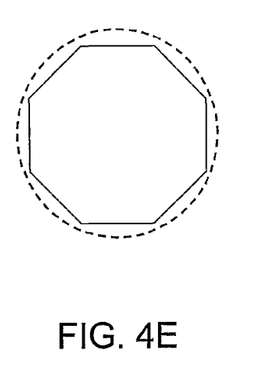
Figure 4F:
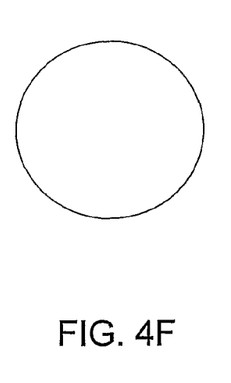
Figure 4G:
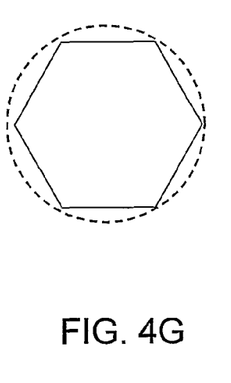

Reference is now made to FIGS. 4A-G, which are illustrations of exemplary repeatable shaped slug geometries formed by the slug processing subsystem, in accordance with embodiments of the current invention. A characteristic dimension "d" indicated in the FIG. 4B is a diameter of a circle that subscribes the geometries as shown in FIGS. 4A, C-G. Characteristic dimension "d" ranges from 40% to 80% of the plastic bottle diameter and "d" is typically ranges from approximately 50 mm to 90 mm for a repeatable slug shaped from a typical 1.5 liter plastic bottle. As noted hereinabove, in addition to exemplary geometries shown in the figure (namely: square; rectangle; triangle; octagon; circle; and hexagon) other repeatable shaped slug geometries may be formed by the slug processing subsystem.

Figure 5:
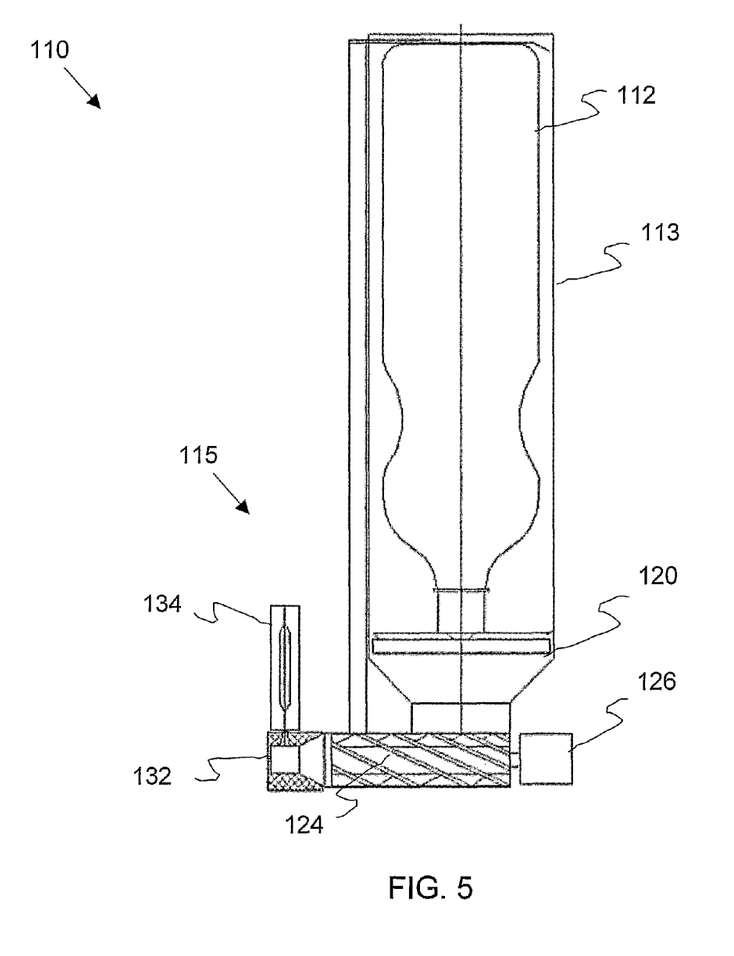
FIG. 5 is a schematic illustration of a system for producing a slug having a repeatable shape from a plastic bottle, in accordance with another embodiment of the current invention.

Reference is now made to FIG. 5, which is a schematic illustration of a system 110 for producing a slug (not shown in the figure) having a repeatable shape from plastic bottle 112, in accordance with another embodiment of the current invention. System 110 has an elongated shaped with an axis in the direction of elongation. Plastic bottle 112, similar to plastic bottle 12 shown in FIGS. 1 and 2A, is loaded coaxially into the system and is constrained within a housing 113. The plastic bottle is compacted in an axial direction by a compacting subsystem (not shown in the figure) towards a slug processing subsystem 115. Slug processing subsystem 115 includes: a bottle chopper unit 120; a fine grinder unit 124; an injector unit 132; and a repeatable shape slug form. Bottle chopper unit 120 receives the plastic bottle. The bottle chopper unit may apply heat to the plastic bottle during chopping. The chopped bottle is then driven into fine grinder unit 124, which further grinds and further heats the chopped bottle. Fine grinder unit 124 drives the chopped and ground bottle in a direction normal to the initial plastic bottle axis towards injector unit 132, which is heated. A drive screw (not shown in the figure) is attached to motor 126, which serves to turn the drive screw and to drive the chopped and ground bottle towards and into the injector unit. Repeatable shape slug form 134 is fitted onto injector unit 132 and receives the heated, finely ground, and now partially liquified plastic bottle from the injector unit to form a repeatable shape slug having, among others, exemplary geometries as shown in FIGS. 4A-G.

Slug processing subsystem 115 may be designed to have various repeatable shape slug forms to form various slug geometries. Furthermore, slugs may be stored manually or automatically in a slug storage magazine (not shown in the figure).

It will be appreciated that the above descriptions are intended only to serve as examples, and that many other embodiments are possible within the scope of the present invention as defined in the appended claims.

What is claimed is:

1. An automated system for producing a slug having a repeatable shape from a plastic bottle, the automated system comprising:

a housing having an elongated shape, an axis in a direction of elongation, and an opening configured to receive the bottle in a generally coaxially orientation with the housing;

a compacting subsystem adapted to compact the bottle substantially in a first direction within the housing; and a slug processing subsystem adapted to form a slug having an essentially predefined form from the compacted bottle, the slug processing subsystem adapted to form the slug by application of force in at least a second direction, substantially normal to the first direction, wherein the slug processing subsystem is adapted to form a slug from a single compacted bottle, wherein the slug processing subsystem is configured to form a slug having a flattened geometric shape, wherein the flattened geometric shape is a polygon having a characteristic dimension less than 90 millimeters.

2. The automated system of claim 1, wherein the slug processing subsystem is configured to form a slug having an essentially repeatable flattened geometric shape.

3. The automated system of claim 1, wherein a flattened dimension of the flattened geometric shape is less than 25 millimeters.

4. The automated system of claim 1, wherein the slug processing subsystem is further adapted to eject a following slug formation.

5. The automated system of claim 4, wherein the slug processing subsystem comprises a slug magazine adapted to store a plurality of ejected slugs.

6. The automated system of claim 1, wherein the compacting subsystem is further adapted to collect and store drained liquid from the compacted bottle.

7. The automated system of claim 1, wherein the first direction is an axial direction.

8. The automated system of claim 1, wherein a volume ratio between the slug and the plastic bottle prior to compaction is between about 1 to 20 and about 1 to 40.

9. The automated system of claim 1, wherein a volume ratio between the slug and the plastic bottle prior to compaction is about 1 to 30.

\* \* \* \* \*